United States Patent [19]
Wendler

[11] Patent Number: 5,890,979
[45] Date of Patent: Apr. 6, 1999

[54] VARIABLE TRANSMISSION APPARATUS FOR BICYCLES

[76] Inventor: Jochen Wendler, Hohengehren 7, D-71573 Allmersbach, Germany

[21] Appl. No.: 833,734

[22] Filed: Apr. 9, 1997

[51] Int. Cl.[6] .............................. F16H 9/24; B62M 9/12
[52] U.S. Cl. .............................. 474/82; 474/78; 474/110
[58] Field of Search .................... 474/78, 79, 80, 474/81, 82, 109, 110

[56] References Cited

U.S. PATENT DOCUMENTS

| 3,742,777 | 7/1973 | Mathauser | 474/82 X |
| 4,938,324 | 7/1990 | Van Dyke | 474/82 X |

FOREIGN PATENT DOCUMENTS

| 1044279 | 6/1953 | France . |
| 2154018 | 5/1973 | France . |
| 3132103 | 4/1982 | Germany . |
| 3719421 | 12/1988 | Germany . |
| 4241521 | 6/1994 | Germany . |

Primary Examiner—Thomas R. Hannon
Attorney, Agent, or Firm—Karl Hormann

[57] ABSTRACT

A gear shift apparatus for bicycles of the kind conventionally known as a derailleur is provided with a selectively actuable master cylinder operatively connected to a slave cylinder. The slave cylinder is mounted in a four-bar-linkage connected to a drive chain guide sprocket such that forces acting transversely of the slave cylinder are substantially avoided.

22 Claims, 3 Drawing Sheets

VARIABLE TRANSMISSION APPARATUS FOR BICYCLES

BACKGROUND OF THE INVENTION

1. Field of the Invention

The invention, in general, relates to a gear shift apparatus for bicycles and, more particularly, to a gear shift apparatus of the kind utilizing a plurality of co-axially arranged sprockets of different sizes and a chain selectively movable into engagement with any one of the sprockets, such apparatus being conventionally known as a derailleur.

2. The Prior Art

Known derailleurs usually are provided with a shift member operating by way of a four-bar-linkage moving device, vice, the shift member being movable, during gear selection, against the bias of a spring by the wire of a Bowden cable. The Bowden cable transmits the force of an actuator operable by a bicyclist, to a derailleur arranged adjacent to the sprockets. The wire which is sectionally guided within a sleeve extends from the end of the sleeve connected to the derailleur, and in this area it is not protected from dirt or moisture. This is particularly disadvantageous because on a bicycle, this portion of the wire is positioned a small distance from the road surface, so that dirt may precipitate on the wire during drives over soft, muddy or dirty roads. The soiled portion of the wire can then no longer move un-impededly into the sleeve. As a result, the shifting mechanism may then be movable either by great force only or not at all. Moisture may also penetrate into the sleeve, especially at the actuator, and lead to corrosion of the wire. Another proven disadvantage is that the wire has to be installed such that neither sharp bends nor kinks can occur in the wire, since the friction between sleeve and wire, which is considerable in any case, would otherwise become intolerably large, and excessive force would have to be applied to actuate the gear shift. Also, the wire would be subjected to excessive wear and tear. Accordingly, the ways in which the Bowden wire can be installed between the handle bar and the derailleur is rather limited.

It is known to use a rotary handle as an actuator (German Offenlegungsschrift 3,719,421), in which the effect of excessive friction within the cable may be lessened by the pitch of a thread serving as the mover, albeit at a large rotational angle. The low thread pitch mandates a correspondingly large angle of rotation of the rotary handle to yield a large shifting force. The basic disadvantages of the cable may, therefore, not be solved by this arrangement. While in the derailleurs mentioned supra the detent device is usually positioned near the derailleur (German Patent 3,132,103), the rotary handle makes it possible to positioning the detent device close to the actuator (German Patent 3,719,421).

In a known bicycle gear shift for bicycles (German Offenlegungsschrift 4,241,521) a master cylinder is directly actuated by a manipulation lever, while a slave cylinder is connected by a cable to the derailleur for moving the chain guide sprocket. Hence, to be activated the piston of the slave cylinder is in one direction pushed against the bias of a spring connected to the cable. Return movement is imparted to a lever by a return spring arranged within the master cylinder. While this known gear shift in general avoids the disadvantages of a Bowden cable, it nevertheless retains the disadvantage of a wire near the derailleur. Furthermore, only the annular surface of the piston in the slave cylinder is acted upon, so that for the requisite shift force the piston must be of a relatively large diameter.

Hydraulic conduits have for a long time been known for transmitting power (French Patent 1,044,279 of 1951). Thus, it has been known to utilize a pivotable lever as an actuator which engages, by way of a pinion, a piston rod formed as a toothed rack of a master cylinder, while a piston rod in the slave cylinder, movable against the bias of a spring, directly engages the sprocket. This well-known hydraulic gear shift arrangement does, however, significantly protrude from the chain shifting mechanism and is thus rendered prone to damage and malfunctioning of the kind not readily repairable, such as, for instance, escaping hydraulic oil.

In yet another hydraulic derailleur (French Patent 2,154,018), a slave cylinder is rigidly connected to a bicycle frame. Such a structure suffers from the disadvantages of protruding significantly, so that it may easily be damaged, and of its slave cylinder having to transmit forces of the kind likely to result in leakage. In another embodiment of this known derailleur (FIG. 11), the slave cylinder is rigidly mounted on a component of the shift mechanism, and motion is transmitted to the chain guide of the shift mechanism by a bilaterally rotatably journal led intermediate member. In this arrangement the slave cylinder is not free of transverse forces. Moreover, because of the unfavorable geometry of the intermediate member the shifting force is depending upon the shift position. It is quite possible that the use of hydraulics in bicycle derailleurs has at best enjoyed limited success because of the described disadvantages.

THE INVENTION AND ITS ADVANTAGES

In contrast to prior art devices, the gear shift apparatus in accordance with the invention described herein offers the advantage of the slave cylinder, because of the casing enclosing it, being protected from dirt and moisture, so that the functioning of the gear shift cannot be impaired by soiling. Furthermore, in accordance with the invention, two hydraulic conduits may be provided, thus avoiding the need for a resilient element, such as a spring, for return movements of the guide sprocket to its initial position. Moreover, since friction occurring in hydraulics is negligible, the gear shift in accordance with the invention can be manipulated easily and with little force. Advantageously, compared to known gear shift arrangements, the hydraulically operating gear shift of the invention is subject to fewer malfunctions and requires less maintenance. As a rule, bends in hydraulic conduits between the actuator and the derailleur do not significantly affect its function, or increase friction, and they do not result in increased actuation forces. Thus, the installation of the hydraulic conduit between the handle bar and the derailleur is simplified.

By mounting the slave cylinder directly at the shifting device for the chain guide sprocket, no additional components which otherwise might distort the shifting force are needed. An optimum transmission of shift forces from the actuator to the chain shifting mechanism is obtained as the shifting direction of the slave cylinder corresponds to the shifting direction of the shifting device. By utilizing pivotal or rotary bearings at the mounting points of the slave cylinder, the slave cylinder in accordance with the invention may be rotated or pivoted, so that transverse forces cannot arise which might result in leakage of the operating cylinder and in transverse forces with corresponding frictional losses. Indeed, the elements in accordance with the invention provide for a fully hydraulically controlled gear shift subject to minimal losses resulting from shifting and controlling. It is of minimum size and, last but not least, requires little maintenance.

By separating the piston from the piston rod, the stroke of the master cylinder as well as of the slave cylinder is rendered immune from transverse forces. If the piston were disposed at an inclination, air might enter into the hydraulic circuit resulting in faulty gear shifting.

In accordance with an advantageous embodiment a four-bar-linkage comprising four pivotal bearings is provided for moving the chain guide sprocket. A base member of the linkage is connected to the frame of the bicycle. The shift member mounted opposite the base member and connected thereto by two substantially parallel arms is connected to the chain guide sprocket, and the slave cylinder engages the two arms. To this end, the space between the two arms need only be sufficiently large to accommodate the slave cylinder. The dimensions of the base member and of the shift member as well as of the arms are selected so as to avoid, over the shift range, i.e. over the operating stroke of the slave cylinder, excessively acute angles between the respective arm and the base member or shift member, as the case may be.

In accordance with a further advantageous embodiment of the invention, at least one of the arms, on its side facing the other arm, is provided with a cantilever for supporting the slave cylinder. In this manner, a diagonal disposition of the slave cylinder within the four-bar-linkage arm may be avoided. The shift range may in this manner correspondingly enlarged, and conforming shift force and shift direction may be more easily attained. Preferably, the slave cylinder may be mounted at least substantially parallel to the arm.

In accordance with a further advantageous embodiment of the invention, there is provided, at at least one of the support positions (mounting points) of the slave cylinder and the derailleur, a device for changing the static length of the slave cylinder. Such a device may be a coupling arranged for longitudinal adjustment on the piston rod of the slave cylinder. The coupling transfers the shifting motion, the given position of the coupling being adjustable by nuts movable along a thread provided on the piston rod. Of course, other kinds of fine or vernier adjustment are conceivable.

In accordance with a further advantageous embodiment of the invention, the spacing between the support positions for the slave cylinder in the derailleur is less than 1,000 mm. Such spacing suffices for the necessary shifting and results in a minimal spatial extent of the derailleur.

In a further advantageous embodiment of the invention, the guide length of the piston rod is in excess of 0.1 mm which advantageously affects the dimensions of the derailleur as well as its actuator.

In accordance with a further advantageous embodiment of the invention the actuator is a rotary handle having a radially extending control cam operatively engaging a piston rod or the piston of a master cylinder and provided with detents for selectively arresting the rotational position of the rotary handle. In connection with the hydraulic system the gear shift in accordance with the invention may thereby be operated in a particularly simple and easy manner. Rotary handle and hydraulic system allow rapid shifting of gears. This is especially true for shifting from a low to a high gear, and vice versa, across several other gears. For gear shifting, the bicyclist need not take his hand off the handle bar. Both hands remain on the handle bar, and the hands may hold onto the handles during shifting. This increases the safety of a bicycle equipped with a gear shift in accordance with the invention relative to bicycles provided with conventional gear shift levers. By utilizing a rotary handle with a detent device, there is no need for any additional limiting indexing such as an abutment screw and the like. The master cylinder may without any problem be mounted on the handle bar of the bicycle since there is adequate space for it. A radially extending control cam offers the advantage that it may without much effort be individually shaped. Simply by changing the control cam, such as an annular cam, a different stroke of the piston rod of the master cylinder cooperating radially with the control cam may be obtained within the same rotating range.

In accordance with a further advantageous embodiment of the invention, the detent device is comprises a resiliently yieldable latch protruding into indentations corresponding to the number of gears. In accordance with a further advantageous embodiment of the invention, the indentations are arranged in the radial surface of the rotary handle in that portion thereof which supports, but is not occupied by, the control cam.

In accordance with a further advantageous embodiment of the invention, the position of the indentations relative to the latch is selected such that some overtravel results when the chain is shifted to another driven or drive sprocket, the arresting indentations of the detent device providing the overtravel when shifting up, by causing the guide sprocket to be moved by the derailleur somewhat beyond its actual operating position, whereby rapid and flawless shifting is accomplished. By exchanging the control cam, which preferably is a ring and which is also provided with the arresting indentations, the rotary handle may be used for six or eight speed, as well as for three speed transmissions. The space between the sprockets of the transmission may also vary, for instance 4.8 mm or 5 mm and so on. Of course, the entire rotary handle actuator may easily be exchanged as its attachment to the handle bar with a clamping device poses no problems. This overtravel which normally applies to the power sprockets may in accordance with the invention also apply to a gear shift on the side of the power sprocket.

The use of a hydraulic system additionally offers, in accordance with the invention, various possibilities as regards the construction of the gear shift. For instance, a special hydraulic oil may be utilized with a consistency substantially immune to temperature and pressure.

In accordance with a further advantageous embodiment of the invention, the hydraulic conduit has an inner diameter not exceeding 3 mm (0.12 ins) and is preferably made of plastic, metal or a similarly hard material. With its small diameter such a hydraulic conduit may easily, and often without damage, be bent. Moreover, the enclosed volume is advantageously minimized. The connections of the hydraulic conduit may be formed by compression rings and sleeve nuts; flexible gaskets may also be used. Thus, in accordance with an advantageous embodiment of the invention, the hydraulic system is provided with at least one air bleeding device, which is preferably located at the leading or trailing end of the hydraulic conduit, for instance near the operating cylinders.

In accordance with a further embodiment of the invention, the pressure and/or liquid volume of the hydraulic device is controllable. In accordance with the invention such a pressure control may also be utilized for the shifting of gears. Depending upon the change of pressure, the slave cylinder and, along with it, the guide sprocket are moved.

In accordance with a further embodiment of the invention, the pressure control acts in a complementing manner, i.e. it regulates or adjusts, depending upon its design, at pressure changes resulting from leaks, temperature changes or external pressure.

In accordance with a further advantageous embodiment of the invention, the control acts automatically or arbitrarily.

These last-mentioned possibilities can satisfy important demands as to the comfort of gear shift mechanisms and are possible in optimized hydraulic gear shifts only.

In accordance with a further advantageous embodiment of the invention, the hydraulic device cooperates with a volume control which is provided with a displacement device which in turn is synchronized with a displacement device of a volume comparator. At a change of its volume relative to a characteristic value, the comparator causes a comparable change in the volume of the hydraulic system in order to maintain a minimum pressure. Thus, the volume comparator increases the volume of the hydraulic system to maintain the effective hydraulic pressure constant, for instance at a substantial increase in the ambient temperature and any expansion of the hydraulic oil resulting therefrom.

In a related advantageous embodiment of the invention, the displacement devices are pistons or piston rods of the operating cylinders of the volume control or of the volume comparator, as the case may be. For their longitudinal strokes the two displacement devices are connected to each other and act against the same resetting force (abutment, spring), such that movement of the displacement device of the volume comparator entails a corresponding movement of the displacement device of the volume control device. Of course, the resetting force which need only be overcome by the change in volume of the volume comparator, must be selected sufficiently large so that it will not be overcome by an operation of the hydraulic device, i.e. when hydraulic fluid is moved within the hydraulic device for the purpose of gear shifting. Thus, the working pressure in the hydraulic device is insufficient to overcome the resetting force. Preferably, the resetting force may be provided by a helical spring with adjustable bias.

In accordance with a further advantageous embodiment of the invention, the master cylinder and the slave cylinder are double acting cylinders, the respective operating chambers of the cylinders being interconnected by parallel hydraulic conduits. One of the hydraulic conduits is connected to the volume control, and the other hydraulic conduit is connected to the volume comparator. In this manner, the volume control and the volume comparator are synchronized since the two hydraulic chambers are approximately equal in size, so that a partial warming of one circuit results in a corresponding adjustment by the other circuit.

In accordance with a related embodiment of the invention, the two hydraulic conduits are connected to each other by a bypass conduit which may be controlled by a valve for balancing the volume. By means of the bypass conduit and the volume balance valve a balance of the volume may easily be attained between the two circuits.

As regards solutions involving comparative values, it is preferred to utilize oils of uniform consistencies. If the values differ from each other, an allowance has to be made for it, either by differing piston diameters or in respect of spring forces, or by different quantities.

Further advantages and advantageous embodiments of the invention may be gathered from the following description, the drawing and the claims.

BRIEF DESCRIPTIONS OF THE SEVERAL DRAWINGS

Several variants of an embodiment of the subject of the invention are depicted in simplified form in the drawing and are described in more detail hereafter.

DETAILED DESCRIPTION OF PREFERRED EMBODIMENTS

Figure 1:
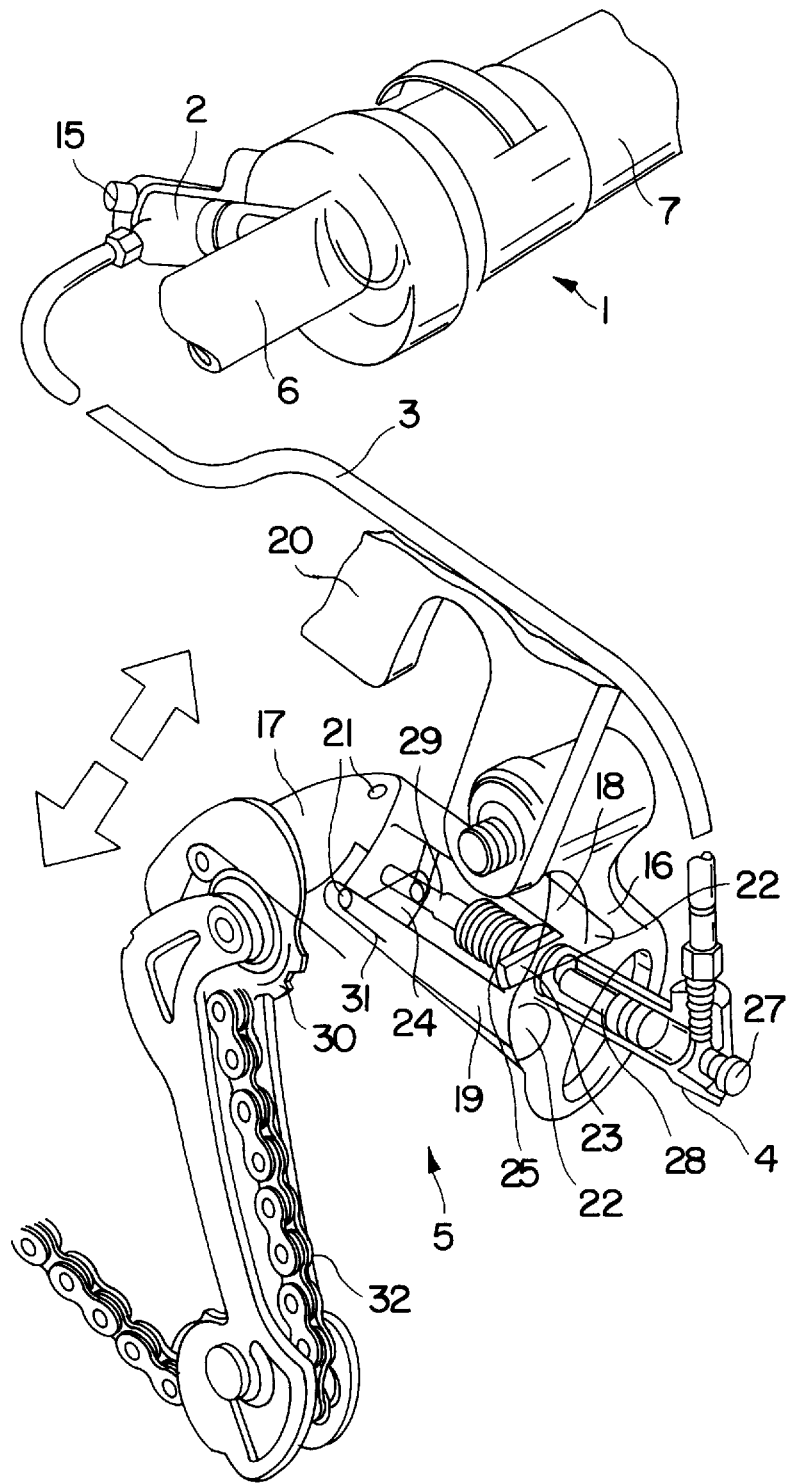
FIG. 1 is a perspective view of the gear shift.
Figure 2:
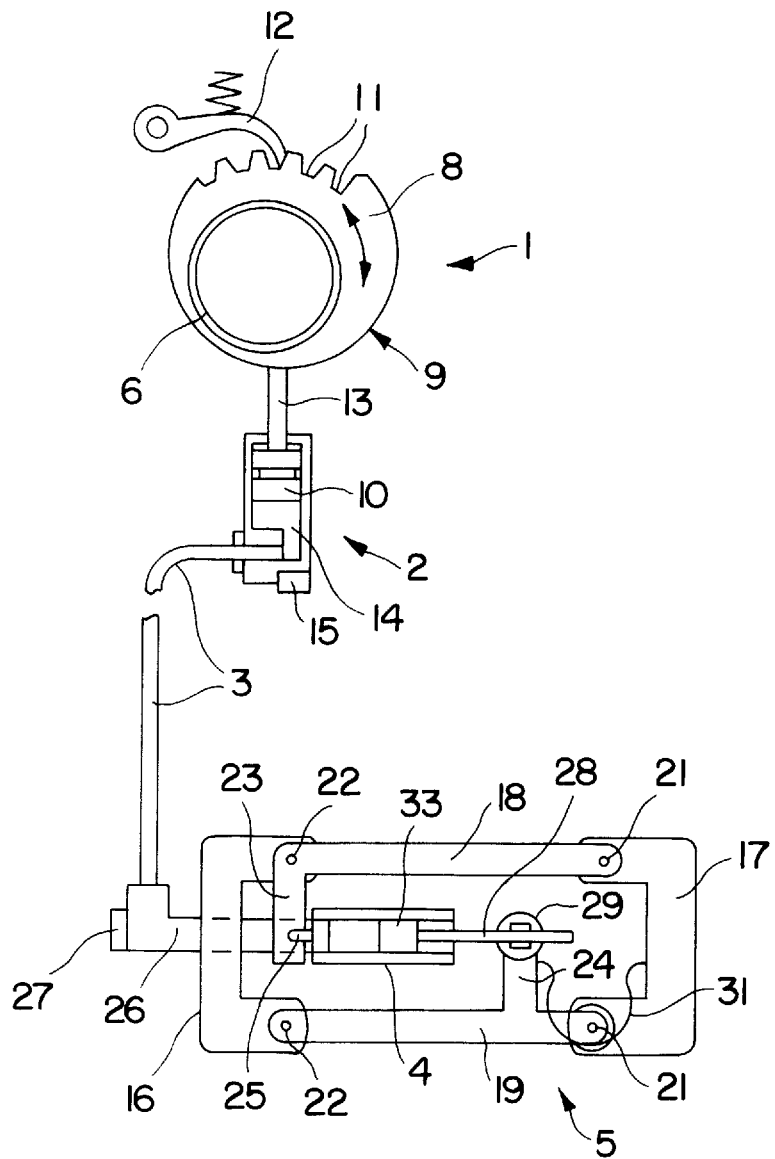
FIG. 2 is a schematic presentation of the gear shift.

In FIGS. 1 and 2, there is depicted gear shift in accordance with the invention with its major components only, without showing the bicycle as a whole. An actuator 1 serves to actuate a master cylinder 2 which, by way of a hydraulic conduit 3, cooperates with a slave cylinder 4 positioned in a derailleur 5.

The actuator 1 is mounted on a handle bar 6 and is provided with a rotary handle 7 which is rotatable relative to the handle bar 6. The rotary handle has an annular cam 8 affixed to it, on one part of the radial surface of which there is provided a cam lobe 9 and on another part of which there are provided indentations 11 cooperating with a latch 12 adapted resiliently to protrude into any one of the indentations 11. The number of indentations 11 ideally corresponds to the number of gears to be accommodated by the gear shift apparatus. The latch 12 will protrude into a different one of the indentations, depending upon the rotational position of the annular cam 8 or of a corresponding segment of the cam lobe 9.

The cam lobe 9 is followed by a free end of a piston rod 13 of a master piston 10 of the master cylinder 2, so that the volume of the cylinder chamber 14 of the master cylinder 2 differs depending upon the segment of the cam lobe 9 or the gear set by the detent device 11, 12. At the junction of the cylinder chamber 14 and the hydraulic conduit 3, there is provided an air bleed screw 15.

The derailleur 5 is provided with a four-bar-linkage having a base member 16 connected to the frame 20 of the bicycle, a shifting member 17 positioned opposite the base member 16, and two arms 18, 19 aligned in substantially parallel relationship for connecting the members 16, 17 to form the four-bar-linkage. The individual parts of the four-bar-linkage are connected to each other by bearings 21 which allow shifting or sliding of the four-bar-linkage in one plane. On the shift member 17, there is mounted a guide sprocket 30, not shown in detail, for moving a bicycle chain 32 onto any one of a plurality of driven sprockets (not shown). A cantilever 23, 24 is mounted on each of the two arms 18, 19 on their sides facing each other, and the slave cylinder 4 is arranged between the cantilevers 23, 24. A bearing 25 is provided for attaching the cantilever 21 to the slave cylinder 4. The bearing 25 allows rotational as well as pivotal movements. Therefore, a connector 2 6 for connecting the slave cylinder 4 to the hydraulic conduit 3 always follows the pivoting movements of the cylinder 4. On the connector 26, near its junction with the hydraulic conduit 3, there is provided an air bleeding screw 27. The piston rod 28 of the slave cylinder 4 which is connected to the cantilever 24 is threaded to allow fine adjustment of a coupling member 29 by moving it axially along the piston rod 28. To provide a resetting force, a spring 31 is provided between the cantilever arm 24 and the shift member 17. No rigid connection is provided between either the slave piston 33 and its piston rod 28 or the master piston 10 and its piston rod 13.

By rotating the cam ring 8 and correspondingly moving the latch 12 from one indentation 11 into another, the piston rod 13 is pushed by the cam lobe 9 so that hydraulic oil is displaced from the cylinder chamber 14 of the master cylinder 2 into the hydraulic conduit 3 causing a proportional displacement of the piston rod 28 in the slave cylinder 4. These positional changes cause a shifting of the four-bar-linkage about its bearings 21, 22 by way of the cantilevers 23, 24 and the force the spring 31, thereby also shifting the chain guide sprocket 30 and the chain 32 for changing of gears.

Figure 3:
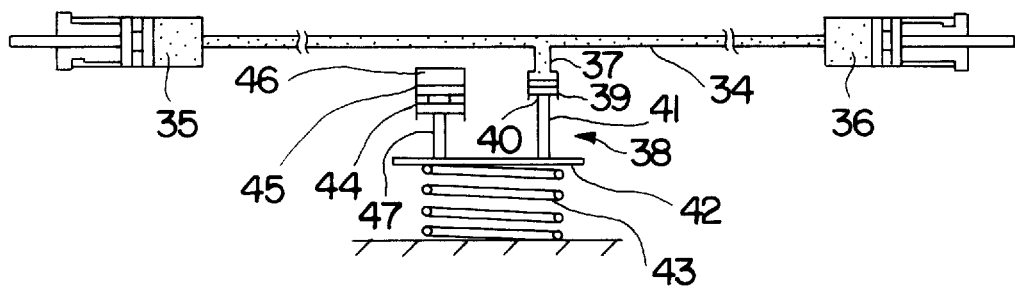
FIG. 3 is a first variant of the hydraulic device of the gear shift.
Figure 4:
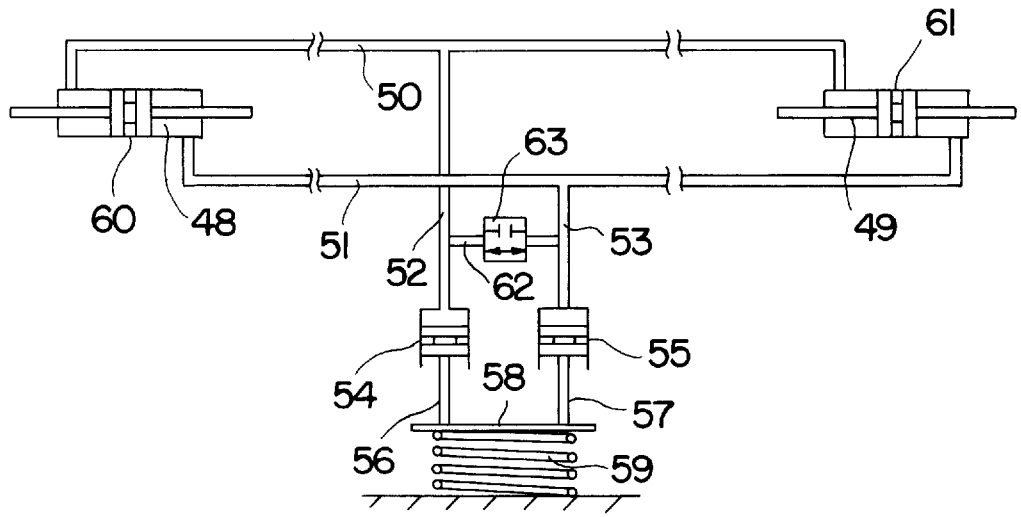
FIG. 4 is a second variant thereof.

Two variants of the hydraulic system are shown in FIGS. 3 and 4, which may be applied to other hydraulic apparatus. A control conduit 37 leading to a volume control 38 branches off the hydraulic conduit 34 at the ends of which the master cylinder 35 and the slave cylinder 36 are respectively arranged. The volume control 38 is provided with a control piston 39 the piston 40 of which is subjected to the fluid in the control conduit 37 and the piston rod 41 (displacement sensor) of which cooperates with an abutment plate 42 which is biased by a helical spring 43. The position of the abutment plate 42 at any given time is determined by a volume comparator 44 which is provided with a cylinder 45 the piston of which is subjected to a fluid similar to the hydraulic oil, and the piston rod 47 (displacement member) of which cooperates with the abutment plate 42. Provided the hydraulic fluid is the same, the volume in the cylinder 45 acting on the piston 46 will correspond to the volume in the hydraulic conduit 34 including the control conduit 37. As soon as the piston 46, by its piston rod 47, displaces the abutment plate 42 against the bias of the hydraulic spring 43, for instance, because of changes in ambient temperature and corresponding expansion of the hydraulic fluid in the volume comparator 44, the piston rod 41 and its piston 40 will follow this displacement thereby to increase the volume in the hydraulic conduit. In this manner, the effects of temperature on the hydraulic shift mechanism are being balanced or compensated.

In the variant of the hydraulic control device shown in FIG. 4 the master cylinder 48 and the slave cylinder 49 are double action cylinders, their respective cylinder chambers being connected by two hydraulic conduits 50 and 51. Control conduits 52 and 53 are respectively branching off these hydraulic conduits 50 and 51 and lead to control cylinders 54 and 55. The piston rods 56 and 57 of these control cylinders act in parallel on an abutment plate 58 which is biased by a spring 59. The hydraulic conduits 50, 51 as well as the control conduits 52, 53 and the control cylinders 54 and 55 are arranged in parallel hydraulic circuits. Accordingly, the pressure in these parallel circuits will be balanced. The pistons 60 and 61 in the master cylinder 48 and in the slave cylinder 49 will thus assume positions at which the pressure on each side of the pistons is the same. Between the control conduits 52 and 53, there is provided a bypass 62 including a valve 63 by which the volumes in the two hydraulic circuits may be balanced when the gear shift is being calibrated, that is to say, the valve 63 will be closed once the actuator 1 and derailleur 5 have been calibrated.

The characteristic elements set forth in the description, claims and drawing may severally and in any desired combination be essential to the invention.

What is claimed is:

1. A transmission apparatus for shifting a moving drive chain of a bicycle relative to a plurality of concentric axially displaced chain sprockets of different diameters mounted coaxially on a drive wheel of the bicycle, comprising:

means including a fluid operated slave cylinder means pivotally connected therewith for shifting said drive chain in a direction normal to its movement relative to said chain sprockets;

means including a fluid operated master cylinder operatively connected by a fluid conduit to said slave cylinder for selectively imparting movement to said shifting means;

means for releasably arresting said movement imparting means; and a piston mounted in said slave cylinder for movement between first and second terminal positions corresponding to the axial displacement of said chain sprockets; and means including a piston rod for connecting said piston to said shifting means.

2. The apparatus of claim 1, wherein said shifting means comprises a drive chain guide sprocket.

3. The apparatus of claim 2, wherein said shifting means comprises a four-bar-linkage including a base member adapted to be connected to a bicycle frame, a shifting member for supporting said guide sprocket and mounted opposite said base member, said shifting member being connected to said base member by a pair of arm members aligned substantially parallel to each other.

4. The apparatus of claim 3, wherein at least one of said arm members is provided with a cantilever for engaging at least one of said slave cylinder and said piston rod.

5. The apparatus of claim 4, wherein said slave cylinder is disposed substantially parallel to said arm members.

6. The apparatus of claim 5, wherein means is provided for adjusting the static length of said slave cylinder.

7. The apparatus of claim 6, wherein each of said arm members is provided with a cantilever respectively connected with said slave cylinder and said piston rod, and wherein the spacing between said cantilevers means is less than 1,000 mm.

8. The apparatus of claim 7, wherein the guide length of said piston rod is in excess of 0.1 mm.

9. The apparatus of claim 8, wherein said movement imparting means comprises a rotatable handle including a radial cam, said radial cam engaging a piston rod of said master cylinder, and wherein said means for selectively arresting comprises a plurality of detents in said rotatable handle.

10. The apparatus of claim 9, wherein said plurality of said detents correspond to the plurality of power sprockets and wherein a resilient latch is provided for selective engagement with said detents.

11. The apparatus of claim 10, wherein said detents are provided in a radial surface area of said rotatable handle.

12. The apparatus of claim 11, wherein said radial cam is of substantially annular configuration provide with a cam lobe in a first segment thereof and wherein said detents are provided in another segment thereof.

13. The apparatus of claim 10, wherein the position of said detents relative to said resilent latch is such as to provide excess movement of said drive chain relative to said power sprockets.

14. The apparatus of claim 1, wherein said fluid conduit means is made of one of metal or plastic and has an internal diameter of no more than 3 mm.

15. The apparatus of claim 1, wherein at least one of said master cylinder, slave cylinder and hydraulic conduit comprises means for controlling at least one of fluid pressure and fluid volume.

16. The apparatus of claim 15, wherein said means for controlling pressure is adapted to adjust said slave cylinder.

17. The apparatus of claim 15, wherein said means for controlling pressure is adapted to changes in fluid pressure as a result of at least one of leakage, temperature and ambient pressure changes.

18. The apparatus of claim 15, wherein said means for controlling pressure is adapted to operate automatically.

19. The apparatus of claim 15, wherein said means for controlling the fluid volume comprises means for sensing displacement of fluid in synchronizing relationship with means for comparing volume of fluid for providing a change in fluid volume analogous to a minimum fluid pressure in response to a deviation from a predetermined fluid volume.

20. The apparatus of claim 19, wherein said displacement sensor means comprises a piston associated with a fluid cylinder of at least one of said volume control means and said volume comparison means, said displacement sensor piston being operatively suspended by resilient means for inducing movement to the piston of one of said slave and master cylinder in response to movement of the other piston of the slave and master cylinder.

21. The apparatus of claim 20, wherein said master cylinder and said slave cylinder are double acting cylinders each having first and second cylinder chambers connected by first and second fluid conduits, said volume control means being connected to one of said fluid conduits and said volume comparator means being connected to the other fluid conduit means.

22. The apparatus of claim 21, wherein said first and second fluid conduits are connected by a bypass provided with a valve for balancing fluid volume.

* * * * *